(12) United States Patent
Miyanaga

(10) Patent No.: US 7,097,396 B1
(45) Date of Patent: Aug. 29, 2006

(54) DRILL BIT

(75) Inventor: Masaaki Miyanaga, Hyogo (JP)

(73) Assignee: Kabushiki Kaisha Miyanaga, Hyogo (JP)

(*) Notice: Subject to any disclaimer, the term of this patent is extended or adjusted under 35 U.S.C. 154(b) by 424 days.

(21) Appl. No.: 10/203,508

(22) PCT Filed: Jul. 12, 2000

(86) PCT No.: PCT/JP00/08662

§ 371 (c)(1),
(2), (4) Date: Oct. 18, 2002

(87) PCT Pub. No.: WO01/60557

PCT Pub. Date: Aug. 23, 2001

(30) Foreign Application Priority Data

Feb. 16, 2000 (JP) .............................. 2000-037718

(51) Int. Cl.
B23B 51/00 (2006.01)

(52) U.S. Cl. ...................... 408/144; 175/415; 408/226; 408/227

(58) Field of Classification Search ................ 408/144, 408/199, 226, 227, 228; 175/415, 389, 395, 175/420.1, 385, 427, 426, 435, 394
See application file for complete search history.

(56) References Cited

U.S. PATENT DOCUMENTS

| | | | | |
|---|---|---|---|---|
| 1,136,987 A | * | 4/1915 | Wakfer | 175/415 |
| 1,964,030 A | * | 6/1934 | Brush | 175/383 |
| 2,260,288 A | * | 10/1941 | Black | 408/228 |
| 2,404,048 A | * | 7/1946 | Gepfert | 408/228 |
| 2,404,049 A | * | 7/1946 | Gepfert | 408/228 |
| 2,640,379 A | * | 6/1953 | Graves | 408/228 |
| 2,673,716 A | * | 3/1954 | Avery | 175/420.1 |
| 2,876,995 A | * | 3/1959 | Neighly, Sr. | 175/395 |
| 3,564,948 A | * | 2/1971 | Pomernacki | 408/211 |
| 3,912,414 A | * | 10/1975 | Fukura et al. | 408/144 |
| 4,160,616 A | * | 7/1979 | Winblad | 408/144 |
| 4,383,784 A | * | 5/1983 | Gulbrandsen | 408/144 |
| 4,889,200 A | * | 12/1989 | Moser | 175/394 |
| 4,903,787 A | * | 2/1990 | Moser et al. | 175/420.1 |

(Continued)

FOREIGN PATENT DOCUMENTS

JP  63-47815 A1  3/1988

(Continued)

OTHER PUBLICATIONS

Supplementary European Search Report (and Annex) by The Hague, dated May 27, 2004 for European Patent Application EP 00 97 9974.

Primary Examiner—Daniel W. Howell
(74) Attorney, Agent, or Firm—Marshall, Gerstein & Borun LLP

(57) ABSTRACT

An object of the present invention is to provide a drill bit which is simple in design, high in rigidity, and superior in durability and whose drilling function is in no way inferior to that of conventional drilling bits. To this end, in a drill bit comprising a cutting blade tip 2 which is united tightly to a tip end of a bit body 1 and a plurality of cutting blade portions 2a, 2b and 2c which are formed around the cutting blade tip 2, a flat surface portion 3 is formed in a side surface of the drill bit from between adjacent cutting blade portions to a base portion of the bit body 1 so that the bit body 1 is formed into a straight configuration having an approximately polygonal cross section.

18 Claims, 5 Drawing Sheets

U.S. PATENT DOCUMENTS

| | | | |
|---|---|---|---|
| 4,950,108 A * | 8/1990 | Roos | 408/59 |
| 5,184,926 A * | 2/1993 | Hemmings | 408/226 |
| 5,482,124 A * | 1/1996 | Haussmann et al. | 175/415 |
| 5,980,166 A * | 11/1999 | Ogura | 408/57 |
| 6,213,232 B1 | 4/2001 | Peetz | |
| 2002/0044844 A1 * | 4/2002 | Adronica | 408/199 |

FOREIGN PATENT DOCUMENTS

| | | |
|---|---|---|
| JP | 2001334403 A * | 12/2001 |
| JP | 2004148482 A * | 5/2004 |
| WO | WO-98/24435 | 12/1998 |

* cited by examiner

DRILL BIT

TECHNICAL FIELD

The present invention relates to a drill bit having a cutting blade tip made of cemented carbide which is united tightly to a tip end side of a bit body of the drill bit by brazing, welding, or the like. This invention relates in particular to a drill bit which is simple in design but is high in rigidity and which is capable of effective ejection of cutting chips created when drilling holes in materials such as concrete, stone, and so forth.

BACKGROUND ART

In drilling holes in materials such as concrete and stone, a special drill bit is attached to a drilling machine, e.g., a rotary hammer drilling machine, and either cutting by rotation or drilling by action of simultaneous application of a vibrational striking force in axial direction and a rotational torque is carried out. And, in order to meet the demand for higher efficiency in such a type of drilling work, drill bits of the type having a cutting blade tip of cemented carbide superior in resistance to abrasion which is united tightly to a tip end side of a steal bit body of the drill bit by brazing, welding, or the like, have been used extensively. Further, like a general-purpose drill, the following configuration has been employed in many cases. That is, a standardized shank portion conforming to the drive shaft is extendedly formed in a base portion of the bit body, and chip ejection grooves are formed in the outer peripheral surface of the bit body in association with cutting blade portions of the cutting blade tip, respectively.

On the other hand, during drilling operations against materials such as concrete and stone by use of the drill bit, i.e., during drilling work (cutting work), lots of powder/particle-like chips are created. However, these cutting chips are not always ejected out through the chip ejection grooves of the bit body.

Particularly, when drilling a hole using a rotary hammer drilling machine or a vibration drilling machine, cutting (impact cutting), in which the blade tip of a drill bit momentarily surfaces from a drill hole cutting surface and immediately thereafter starts impactingly knocking the drill hole cutting surface, is carried out. And, the movement of the drill bit in the longitudinal direction of the shaft of the drill bit during such knocking action also helps a lots of chips to be ejected out through a clearance defined between the bit body and the drill hole.

Further, for the case of rotary hammer drilling machines or for the case of vibration drilling machines, even when chips of relatively large particle size are created on a drill hole cutting surface, they are ground into small particles while impact cutting is repeatedly carried out on the drill hole cutting surface. Therefore, the situation that chips of large particle size remain in a drill hole to cause interference with drilling operations hardly occurs.

However, for the case of drill bits of small bit diameter, e.g., for the case of a drill bit whose bit diameter is not more than about 6 mm and which is provided with chip ejection grooves formed helically around the outer peripheral surface of a drill body, the rigidity of the drill bit falls because of the formation of the chip ejection grooves. This increases the rate of breakage during drilling operations. Particularly, for the case of drilling operations with a rotary hammer drilling machine or with a vibration drilling machine in which impact force in the longitudinal direction of the shaft is applied, the rate of breakage becomes high.

DISCLOSURE OF THE INVENTION

Under the circumstances, this invention was made. Accordingly, an object of the present invention is to provide, as a drill bit for use in drilling holes in materials such as concrete and stone, a drill bit whose drilling function easily stands comparison with that of conventional drill bits, which is simple in design to provide improved productivity, and which is high in bit body rigidity to provide improved durability, which is particularly suitable for drill bits for drilling holes of small diameter.

A drill bit according to a first invention, which comprises a cutting blade tip formed of a block body which is united tightly to a tip end of a bit body of the drill bit and a plurality of cutting blade portions which are formed circumferentially around the cutting blade tip, is characterized in that a flat surface portion is formed in a side surface of the drill bit from between adjacent cutting blade portions of the plural cutting blade portions to a base of the bit body, and the bit body is formed into a straight configuration having an approximately polygonal cross section.

A drill bit according to a second invention, which comprises a cutting blade tip formed of a block body which is united tightly to a tip end of a bit body of the drill bit and a plurality of cutting blade portions which are formed circumferentially around the cutting blade tip, is characterized in that a concave surface portion extending in the direction of the length of the bit body is formed in a side surface of the drill bit from between adjacent cutting blade portions of the plural cutting blade portions to a base of the bit body, and the bit body is formed into a straight configuration having an approximately polygonal cross section.

In accordance with the drill bit constructed in the way as described above, when drilling holes in materials such as concrete and stone, there is defined a larger clearance between the bit body formed into a straight configuration having an approximately polygon In accordance with the drill bit constructed in the way as described above, when al cross section and a drill hole in comparison with drilling by a convention drill bit having a circular cross section. Accordingly, the motion of the drill bit in the longitudinal direction of the shaft also helps powder/particle-like chips created at the tip end to travel upward from the tip end through the clearance and to be smoothly ejected out of the drill hole.

Therefore, the drilling function of the drill bit formed in accordance with the present invention is in no way inferior to that of conventional drill bits. Further, the drill bit of the present invention is manufactured just by tightly uniting a cutting blade tip comprising a block body to the tip end of a bit body of a given length which has no chip ejection groove and which is formed into a straight configuration having an approximately polygonal cross section, thereby being superior in productivity at the time of manufacture. Further, since the bit body has a straight configuration having an approximately polygonal cross section and differs from conventional ones in that it has no chip ejection groove having a rectangular cross section, this makes it possible to eliminate a "notch effect" known in the field of the strength of materials. Accordingly, the drill bit of the present invention will not undergo a drop in the rigidity in comparison with conventional drill bits and is therefore particularly suitably used as a drill bit for small diameter hole drilling which is susceptible to breakage during drilling operations. And, the drill bit of the present invention is less subject to breakage and is superior in durability, regardless of small diameter or large diameter, and the present invention provides drill bits (products) of high quality. Furthermore, as described above, the drill bit of the present invention is suitable for improving productivity and can be provided inexpensively.

If the drill bit of the present invention employs such a construction that three cutting blade portions are formed around the cutting blade tip so that its bit body is formed into a straight configuration having an approximately triangular cross section, this makes it possible to provide a practically optimal embodiment manner in which rotation during drilling is well balanced, each cutting blade portion exhibits effective cutting properties, and the bit body exhibits highly reliable rigidity.

Further, if the drill bit described above employs such a construction that the outer end of each cutting blade portion is projected slightly beyond the bit body surface to form a stepped portion at an area where the bit body and the cutting blade tip are united together tightly, the action of upwardly scratching chips present in a drill hole is further promoted by the stepped portion of each cutting blade portion which projects outwardly from the bit body, at the time of impact cutting in which the drill bit moves in the direction of the shaft axis. This provides a construction suitable for the release of chips.

Furthermore, if the drill bit described above employs such a construction that a connecting line of a cutting surface and a flank surface which are formed in each cutting blade portion of the cutting blade tip acts as a cutting edge and these cutting edges are connected together at a blade tip point so that the blade tip point is shaped like a peak without any chisel point, adjoining cutting edges of these cutting edges cooperate to effectively crush chips of large size created in the cutting surface of a drill hole into small particles. This provides a construction capable of reducing biased resistance that the blade tip will receive, of making the drill bit free from run-out, and of enabling the blade tip point shaped like a peak to always lie in the center of the cutting surface of the drill hole. As a result, the roundness of drill holes drilled by the drill bit of the present invention is improved and it becomes possible to drill constant-diameter holes at high accuracy.

Further, the drill bit of the present invention may employ such a construction that, as in a general-purpose drill, a standardized shank is additionally formed at a base portion of the bit body. In such a case, it is possible to adequately change and attach drill bits of different diameters to a drive shaft (a single rotary hammer drilling machine) as a common drill bit mount. This therefore provides a drill bit capable of quick change. However, even for the case of a drill bit of the present invention without additional formation of a shank, it is possible to directly and readily hold (connect) the base portion of the bit body formed into a straight configuration having a polygonal cross section by a chuck structure mounted onto the drive shaft of a general rotary hammer drill. In this case, since it is sufficient that a base potion of the bit body of the drill bit be simply cut to a desired length to form a sectional end, it is possible to reduce the number of process steps required in the manufacture of drill bits, to save material, and to provide inexpensive drill bits. Additionally, the weight of a drill bit itself is reduced, thereby improving portability.

Further, the drill bit of the present invention is applicable, of course, to rotary hammer drilling machines and vibration drilling machines as well as to rotary drilling machines.

BRIEF DESCRIPTION OF THE DRAWINGS

FIG. 6 is a Figure showing cross sections of bit bodies according to exemplary embodiments different from the embodiment shown in FIGS. 1–4, wherein
FIG. 6(a) is a cross-sectional view of a bit body in which a concave surface portion is formed in a drill bit side surface whereas

BEST MODE FOR CARRYING OUT THE INVENTION

Hereinafter, a first exemplary embodiment of a drill bit according to the present invention will be described in conjunction with the Figures.

As shown in FIGS. 1–4, a drill bit has a bit body 1 and a cutting blade tip 2 which comprises a block body. The material of the bit body 1 is steal and the cutting blade tip 2 made of cemented carbide is tightly united to a tip end (a lower end) of the bit body 1.

Figure 4:
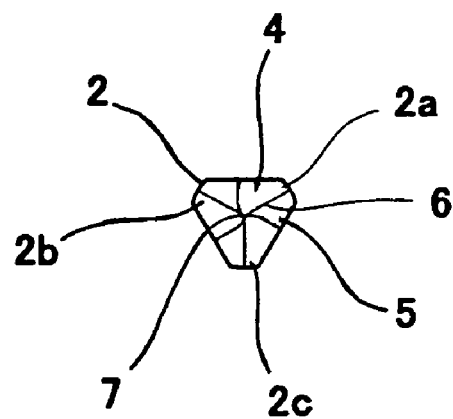
FIG. 4 is a bottom view of the drill bit shown in FIG. 1.

As shown in FIG. 4, three cutting blade portions 2a, 2b and 2c are formed circumferentially equidistantly around the cutting blade tip 2. Alternatively, an arrangement, not shown in Figure, may be made in which the three cutting blade portions 2a, 2b and 2c are formed circumferentially, approximately equidistantly around the cutting blade tip 2 or are formed circumferentially unequidistantly around the cutting blade tip 2.

Formed in each cutting blade portion 2a, 2b and 2c are a cutting surface 4 and a flank surface 5. A connection line of the cutting surface 4 and the flank surface 5 acts as a cutting edge 6. The cutting edges 6 are joined together at a blade tip point 7 so that the blade tip point 7 is shaped like a peak without any chisel point.

Figure 1:
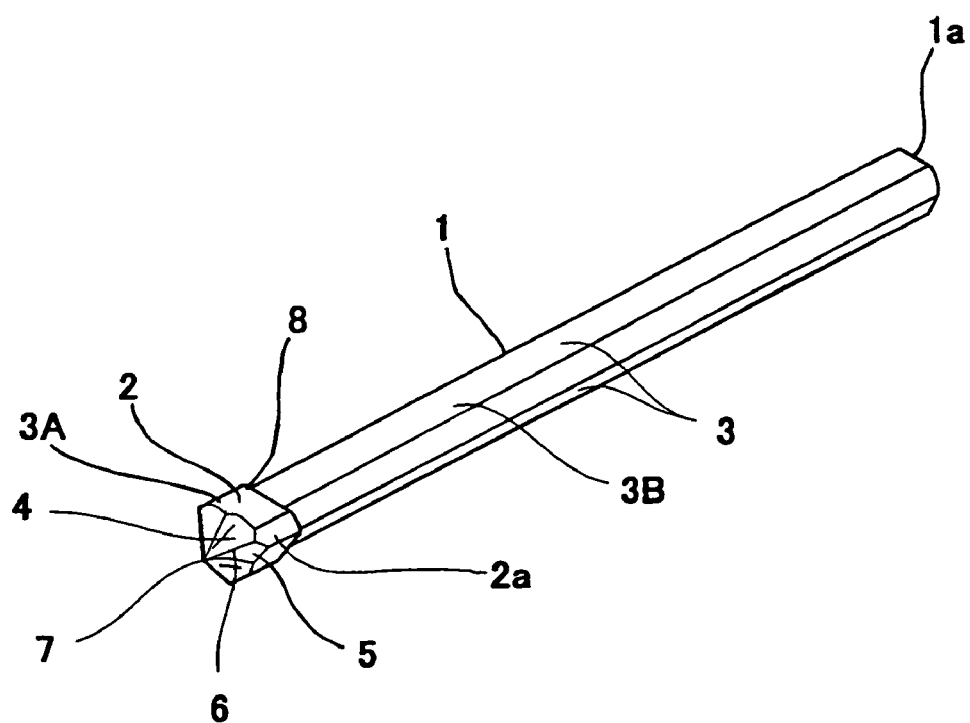
FIG. 1 is an entire perspective view of a drill bit showing an exemplary embodiment of the present invention.
Figure 2:
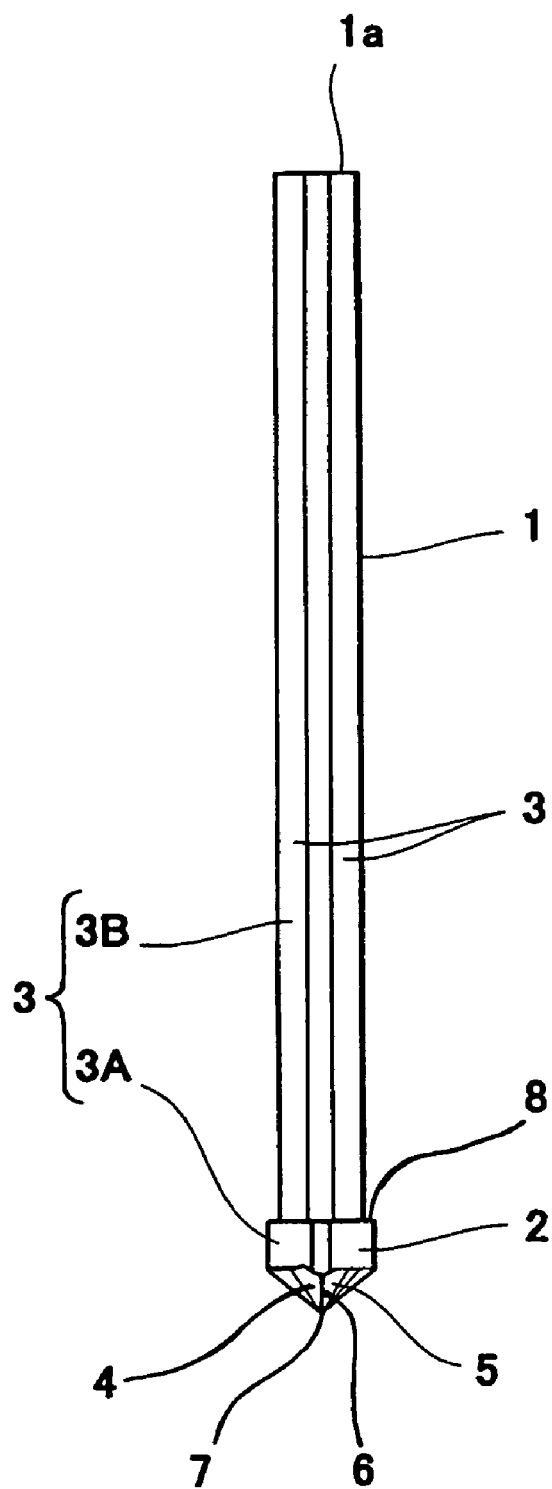
FIG. 2 is a side view of the drill bit shown in FIG. 1.
Figure 3:
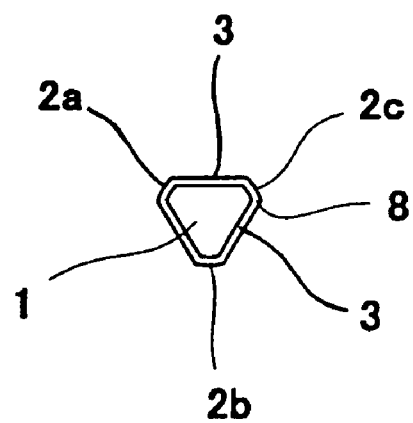
FIG. 3 is a top view of the drill bit shown in FIG. 1.

As shown in FIGS. 4 and 1, a flat surface portion 3, whose start edge is between adjacent cutting blade portions of the cutting blade portions 2a, 2b and 2c of the cutting blade tip 2 and whose end edge is a base end of the bit body 1, is formed in a side surface of the drill bit. In other words, in the present embodiment a flat surface 3A is formed in a side surface area defined between two adjacent cutting blade portions of the cutting blade portions 2a, 2b and 2c, whereas a flat surface 3B in stepped connection with the flat surface 3A is formed into a straight configuration extending from the tip end to the base end of the bit body 1 along the longitudinal direction thereof.

And, by virtue of the three flat surfaces 3A and the three flat surfaces 3B, the cross section of the drill bit from the base end to the rear end of each cutting blade portion 2a, 2b and 2c is an approximately polygonal figure, for example, "an approximately triangular shape" in the present embodiment, that is, a triangular shape in which a corner at which each flat surface 3B is connected to the other is round. The bit body 1 is formed into a straight configuration having an approximately triangular cross section.

When the bit body 1 and the cutting blade tip 2 are tightly united together, an outer end of each cutting blade portion 2a, 2b and 2c is made to project, toward the outside (toward the outside diameter), slightly beyond the outer peripheral surface of the bit body 1 so that a stepped portion 8 is formed between the bit body 1 and the cutting blade tip 2.

In the drill bit, a shank portion for connection with a drilling machine is not formed at the base of the bit body 1. In other words, as described above, the drill bit is formed into a straight configuration from its connecting portion to the cutting blade tip 2 up to a sectional end 1a of the base of the bit body 1.

Figure 5:
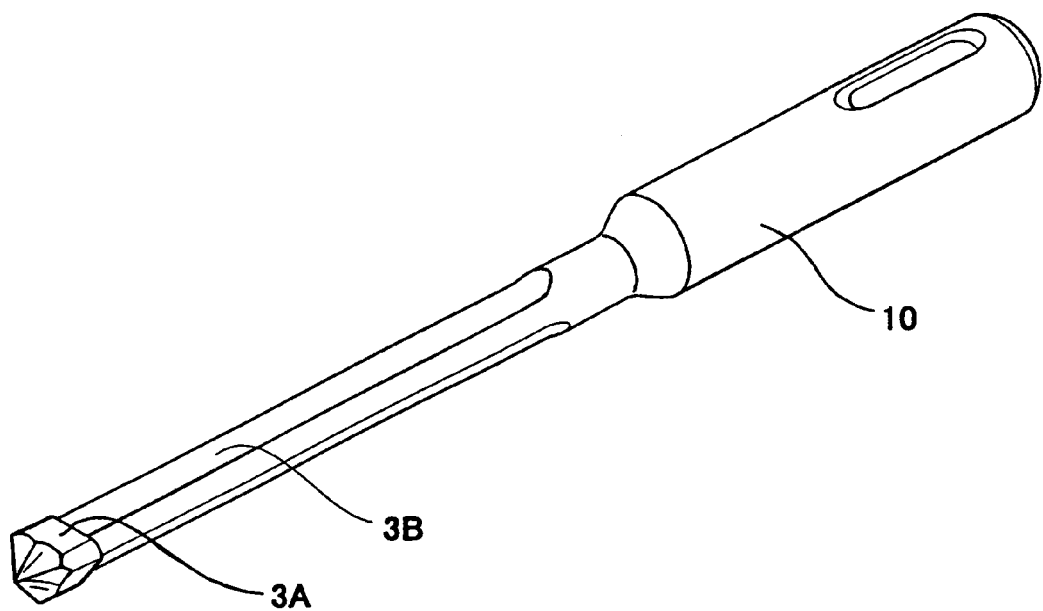
FIG. 5 is a side view of a drill bit according to an exemplary embodiment which differs from the embodiment shown in FIGS. 1–4 in that its bit body is provided with a special shank portion.

However, as shown in FIG. 5, a shank portion 10 may be formed at the base of the bit body 1. In this case, it is possible to adequately and switchably use drill bits of different diameters with respect to a special mounting hole of a drive shaft side for the mounting of a drill bit. The present embodiment is excellent because it not only reduces the time taken for drill bit change but also provides a reliable hold (connection).

Figure 6A:
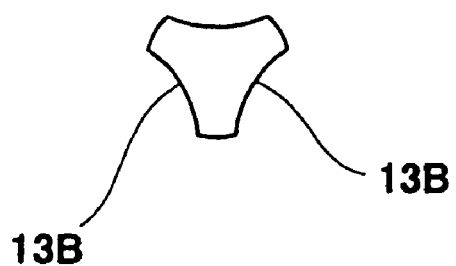

Further, the drill bit may have any approximately polygonal cross section. For example, as shown in FIG. 6(a), the drill bit may have a cross section defined by concave surface portions 13B of curvature surfaces, in place of a cross section defined by the flat surface portions 3B of FIGS. 1 and 3. In such a case, preferably the cutting blade tip also has a cross section defined by concave surface portions similar to the concave surface portions 13B, in place of a cross section defined by the flat surface portions 3A.

Figure 6B:
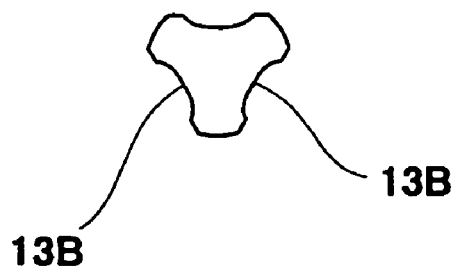
FIG. 6(b) is a cross-sectional view of a bit body in which a concave surface portion different from the one shown in FIG. 6(a) is formed in a drill bit side surface.

Alternatively, as shown in FIG. 6(b), concave surface portions 13B each comprising a curvature surface and a flat surface may be used. In such a case, preferably the cutting blade tip also has a cross section defined by concave surface portions similar to the concave surface portions 13B, in place of a cross section defined by the flat surface portions 3A.

Further, other than the above described approximately triangular cross sections, the cross section may be other approximately polygonal figures, for example, an approximately rectangular figure and an approximately pentagonal figure.

In the foregoing exemplary embodiment, it is constructed such that the cutting surface 4 and the flank surface 5 between adjacent cutting blade portions of the cutting blade portions 2a, 2b and 2c of the cutting blade tip 2 are directly connected together. However, the present invention is not limited to such a construction. Alternatively, instead of employing such a construction, a connecting surface (not shown) in an adequate form may be formed between the cutting surface 4 and the flank surface 5 between each cutting blade portion 2a, 2b and 2c.

And, when a drill bit having the above-described construction is used, the base portion of the bit body 1 having a polygonal cross section and formed into a straight configuration is directly held by a chuck mounted onto the drive shaft of a rotary hammer drilling machine (or a vibration drilling machine), whereby drilling a hole or holes in materials such as concrete and stone cab be carried out. Further, for the case of a drill bit with the shank portion 10 of FIG. 5, it can be mounted in a mounting hole of the drive shaft.

And, in drilling holes in materials such as concrete and stone, powder/particle-like chips created in a drill hole are smoothly ejected out of the drill hole through a clearance defined between the bit body 1 and the drill hole by the movement of the drill bit in the longitudinal direction of the shaft (hammering operation) and by the upward scratching action of the stepped portion 8 formed in the outer end of each cutting blade portion 2a, 2b and 2c due to the aforesaid shaft axis direction movement. Further, in accordance with the drill bit of the present embodiment, the three cutting edges 6 extend radially from the blade tip point 7. Therefore, the blade tip point 7 is shaped like a peak without any chisel point, so that during drilling operations accompanying impact cutting, the blade tip point 7 having such a peak-like structure always lies in the center of a drill hole cutting surface, thereby making it possible to drill constant-diameter holes at high accuracy. On the other hand, for the case of rotary drilling machines, there occurs no movement in the shaft axis direction and cutting operations are performed by movement in rotational direction, and chips are smoothly ejected out of a drill hole through a clearance defined between the bit body 1 and the drill hole.

INDUSTRIAL APPLICABILITY

The present invention can be carried out in manners as described above, and the drill bit of the present invention can be used by being mounted in place of a conventional drill bit, without changing a chuck or the like of a rotary hammer drilling machine. As a result, in drilling a hole in materials such as concrete and stone, the drilling function of the drill bit of the present invention is in no way inferior to that of conventional drill bits.

In addition to the above, the drill bit of the present invention employs the following "simple" design. That is, unlike conventional drill bits, the drill bit of the present invention has no spiral chip ejection groove, and a cutting blade tip formed of a block body is united tightly to a tip end of a bit body having a given length and formed into a straight configuration having a polygonal cross section. As a result of such a design, it is possible to achieve excellent productivity, and excellent durability because there is no drop in the rigidity due to the provision of chip ejection grooves. Further, it is possible to provide inexpensive drill bits.

What is claimed is:

1. A drill bit comprising: a cutting blade tip formed of a block body which is unremovably attached to a tip end of a bit body of said drill bit and a plurality of cutting blade portions which are formed circumferentially around said cutting blade tip, characterized in that the cutting blade tip and the bit body are made of different materials, a flat surface portion is formed in a side surface of said drill bit from between adjacent cutting blade portions of said plural cutting blade portions to a base portion of said bit body, and said bit body is formed into a straight configuration having an approximately polygonal cross section; and an outer end of each said cutting blade portion is made to project slightly beyond the surface of said bit body to form a stepped portion over the entire periphery of an area where said bit body and said cutting blade tip are attached.

2. A drill bit comprising: a cutting blade tip formed of a block body which is unremovably attached to a tip end of a bit body of said drill bit and a plurality of cutting blade portions which are formed circumferentially around said cutting blade tip, characterized in that the cutting blade tip and the bit body are made of different materials, a concave surface portion extending in the direction of the length of said bit body is formed in a side surface of said drill bit from between adjacent cutting blade portions of said plural cutting blade portions to a base portion of said bit body, and said bit body is formed into a straight configuration having an approximately polygonal cross section; and an outer end of each said cutting blade portion is made to project slightly beyond the surface of said bit body to form a stepped portion over the entire periphery of an area where said bit body and said cutting blade tip are attached.

3. The drill bit according to claim 1, wherein three cutting blade portions are formed around said cutting blade tip so that said bit body is formed into a straight configuration having an approximately triangular cross section.

4. The drill bit according to claim 2, wherein the blade tip is made of cemented carbide and the bit body is made of steel.

5. The drill bit according to claim 1, wherein a connecting line of a cutting surface and a flank surface which are formed in each said cutting blade portion of said cutting blade tip acts as a cutting edge and wherein said cutting edges are connected together at a blade tip point so that said blade tip point is shaped like a peak without any chisel point.

6. The drill bit according to claim 1 wherein said base portion of the bit body is cut to a desired length to form a sectional end for setting the total length of said drill bit.

7. The drill bit according to claim 2, wherein three cutting blade portions are formed around said cutting blade tip so that said bit body is formed into a straight configuration having an approximately triangular cross section.

8. The drill bit according to claim 2, wherein a connecting line of a cutting surface and a flank surface which are formed in each said cutting blade portion of said cutting blade tip acts as a cutting edge and wherein said cutting edges are connected together at a blade tip point so that said blade tip point is shaped like a peak without any chisel point.

9. The drill bit according to claim 3, wherein a connecting line of a cutting surface and a flank surface which are formed in each said cutting blade portion of said cutting blade tip acts as a cutting edge and wherein said cutting edges are connected together at a blade tip point so that said blade tip point is shaped like a peak without any chisel point.

10. The drill bit according to claim 2, wherein said base portion of the bit body is cut to a desired length to form a sectional end for setting the total length of said drill bit.

11. The drill bit according to claim 3, wherein said base portion of the bit body is cut to a desired length to form a sectional end for setting the total length of said drill bit.

12. The drill bit according to claim 5, wherein said base portion of the bit body is cut to a desired length to form a sectional end for setting the total length of said drill bit.

13. The drill bit according to claim 7, wherein a connecting line of a cutting surface and a flank surface which are formed in each said cutting blade portion of said cutting blade tip acts as a cutting edge and wherein said cutting edges are connected together at a blade tip point so that said blade tip point is shaped like a peak without any chisel point.

14. The drill bit according to claim 7, wherein said base portion of the bit body is cut to a desired length to form a sectional end for setting the total length of said drill bit.

15. The drill bit according to claim 8, wherein said base portion of the bit body is cut to a desired length to form a sectional end for setting the total length of said drill bit.

16. A drill bit comprising: a cutting blade tip formed of a block body which is unremovably attached to a tip end of a bit body of said drill bit and a plurality of cutting blade portions which are formed circumferentially around said cutting blade tip, characterized in that, a flat surface portion is formed in a side surface of said drill bit from between adjacent cutting blade portions of said plural cutting blade portions to a base portion of said bit body, and said bit body is formed into a straight configuration having an approximately polygonal cross section, and an outer end of each said cutting blade portion is made to project slightly beyond the surface of said bit body to form an edge-shaped stepped portion over the entire periphery of an area where said bit body and said cutting blade tip are attached.

17. A drill bit comprising a cutting blade tip formed of a block body which is unremovably attached to a tip end of a bit body of said drill bit and a plurality of cutting blade portions which are formed circumferentially around said cutting blade tip, characterized in that a concave surface portion extending in the direction of the length of said bit body is formed in a side surface of said drill bit from between adjacent cutting blade portions of said plural cutting blade portions to a base portion of said bit body, and said bit body is formed into a straight configuration having an approximately polygonal cross section, and an outer end of each said cutting blade portion is made to project slightly beyond the surface of said bit body to form an edge-shaped stepped portion over the entire periphery of an area where said bit body and said cutting blade tip are attached.

18. The drill bit according to claim 1, wherein the blade tip is made of cemented carbide and the bit body is made of steel.

* * * * *

UNITED STATES PATENT AND TRADEMARK OFFICE
CERTIFICATE OF CORRECTION

| | |
|---|---|
| PATENT NO. | : 7,097,396 B1 |
| APPLICATION NO. | : 10/203508 |
| DATED | : August 29, 2006 |
| INVENTOR(S) | : Masaaki Miyanaga |

It is certified that error appears in the above-identified patent and that said Letters Patent is hereby corrected as shown below:

In the Title Page

At Section 22, please delete "Jul. 12, 2000" and insert instead -- Dec. 12, 2000 --.

Signed and Sealed this

Tenth Day of April, 2007

JON W. DUDAS
*Director of the United States Patent and Trademark Office*